Figure 1:
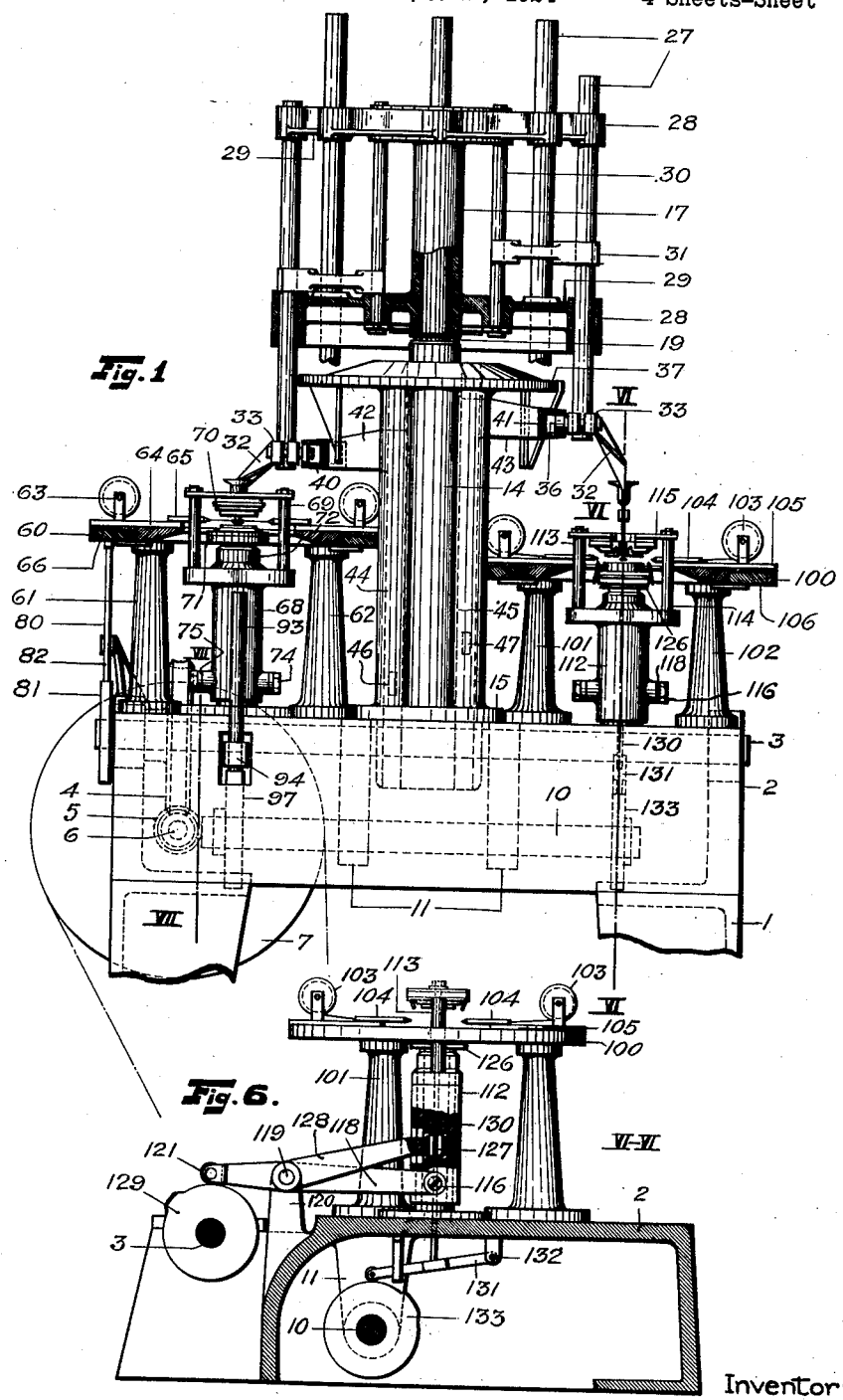

March 8, 1927. 1,620,523
H. DE JONG ET AL
HOOK FORMING AND INSERTING MACHINE
Filed Sept. 22, 1924 4 Sheets-Sheet 1

Inventors:
Hendrik de Jong,
Willem Koning,
by Their Attorney.

March 8, 1927.

H. DE JONG ET AL 1,620,523

HOOK FORMING AND INSERTING MACHINE

Filed Sept. 22, 1924    4 Sheets-Sheet 3

Inventors:
Hendrik de Jong,
Willem Koning,
by
Their Attorney.

March 8, 1927. 1,620,523
H. DE JONG ET AL
HOOK FORMING AND INSERTING MACHINE
Filed Sept. 22, 1924  4 Sheets-Sheet 4
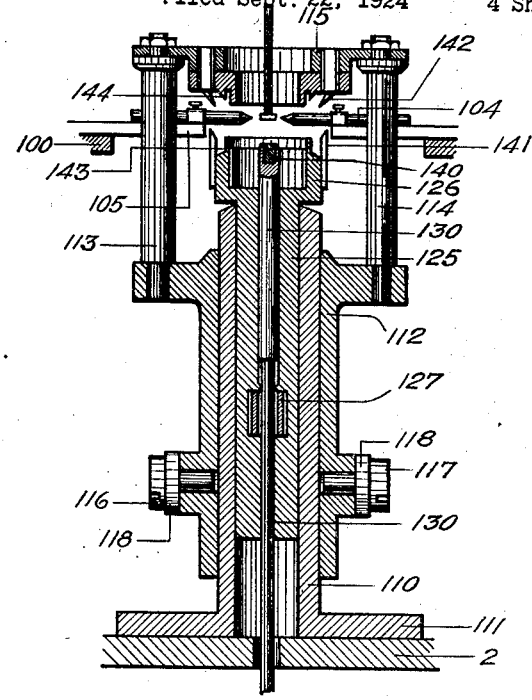
Fig. 5. V-V.
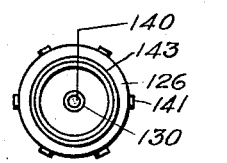
Fig. 8
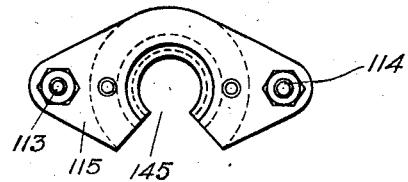
Fig. 9.
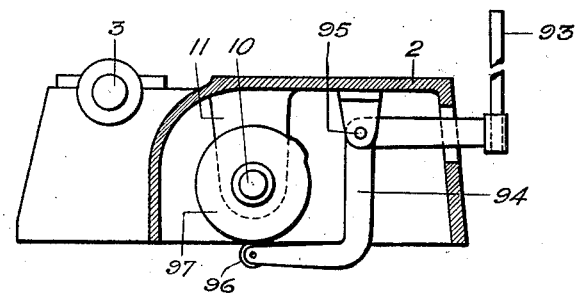
Fig. 7. VII-VII
Inventors:
Hendrik de Jong,
Willem Koning,
by Alexander S. Lentz
Their Attorney.

Patented Mar. 8, 1927.

1,620,523

UNITED STATES PATENT OFFICE.

HENDRIK DE JONG AND WILLEM KONING, OF EINDHOVEN, NETHERLANDS, ASSIGNORS TO GENERAL ELECTRIC COMPANY, A CORPORATION OF NEW YORK.

HOOK FORMING AND INSERTING MACHINE.

Application filed September 22, 1924, Serial No. 739,002, and in the Netherlands December 5, 1923.

The present invention relates to machines for bending filament support wires, which are bent at one end in the form of a hook to hold the filament, and for inserting these wires into the glass rods of electric lamps and the like. In the following specification these supporting wires as a whole are called "hooks." They are usually inserted in an enlarged top or in an enlarged button of a glass rod. The button of a rod is understood to mean an enlarged portion of the rod, near where it is fused in the seal of a lamp stem.
A glass rod is understood to mean also a hollow rod or tube, which is used in some cases, and as a rule the glass rod will be fused into a glass stem, in which the leading-in wires are sealed, before the hooks are inserted.
Machines for inserting hooks into glass rods are already known. It has for instance been proposed to simultaneously insert the hooks by means of a corresponding number of radially moving wire-carrying devices, and also machines are known in which hooks are bent at the end of the wires that have been inserted in the glass rods.
The present invention has for its object to provide a machine of this type which can be correctly and rapidly operated so that it needs only little supervision.
In a machine according to the invention at least one set of dies each comprising two ring-shaped dies movable in relation to each other, for cutting off and eventually bending the hooks, and means for laterally moving a glass rod in relation to the dies are provided.
In order to laterally move the rod towards and away from the dies it would be possible to make each die of relatively movable parts. It is preferred however to provide at least one of the dies of a set, that serves for bending the hooks inserted in the enlarged top of the rod or in the button with a vertical slot for the passage of the laterally moving glass rod.
According to the invention the glass rods may be laterally movable in relation to the dies when brought into operating position as well as when moved away from the dies. To this end for instance a bent arm bearing the glass rod may be pivotally mounted on a vertical shaft. In the known machines the glass rods are heated in the inserting position before the hooks are inserted. When vertically movable ring-shaped dies are provided such heating has the disadvantage that the cutting edges and the bending dies are injuriously affected by the flames.
According to the invention devices are provided for heating a part of the glass rod away from the inserting position to a sufficient heat to enable the forming of a button or an enlarged tap on the rod and the inserting of the hooks.
For the forming of the enlarged top or the button a push rod may be provided, which is vertically movable along the axis of the ring-shaped dies.
The machine according to the invention can be easily made adapted for simultaneously inserting the hooks into the top and into the button of the glass rod. To this end two sets of dies may be provided above each other, which dies are reciprocated at desired moments for cutting off and bending the hooks. Such arrangement however shows the disadvantage that the machine cannot easily be adapted for the manufacturing of lamp stems with different numbers of hooks and with tops and buttons spaced apart at different distances.
According to the invention it is therefore preferred to provide separate means for inserting hooks in two different positions into the button and into the top of a glass rod, respectively, in which case a device can be provided for automatically carrying the glass rod from the one inserting position into the other. Preferably the machine is provided with means for carrying and working the glass rod with the top projecting downwards, and with means for inserting hooks first into the button and then into the top.
In this case means may be provided for vertically moving the glass rod into the positions for inserting and forming hooks and for laterally moving them away from these positions.
The devices for inserting hooks in the top of the rod and in the button need not be arranged in one horizontal plane; they can also be arranged at different heights beside or even above each other.
A practical arrangement of a machine according to the invention comprises an intermittently movable spider provided with vertically movable carriers for the glass rods, vertically movable rods for forming the button and the top respectively in separate positions, means for heating the glass rod in different positions, means for inserting hooks in different positions of the glass rod and means for automatically moving the different members into operating position in relation to each other.

In order to vertically move the glass rods towards the dies and to laterally move them away from the dies, the carriers of the glass rods may be provided with rollers or similar devices that are controlled during the movement of the spider by a fixed horizontal guide and two corresponding vertically movable guides.

The machine according to the invention may include other features, which will be seen from the following description of a particular form in accordance with the accompanying drawing.

In the drawing a machine is shown in which the glass rods are vertically moved towards the vertically reciprocating dies and laterally moved from these dies, and in which the inserting of the hooks in the top and in the button is effected in separate positions.

Figure 2:
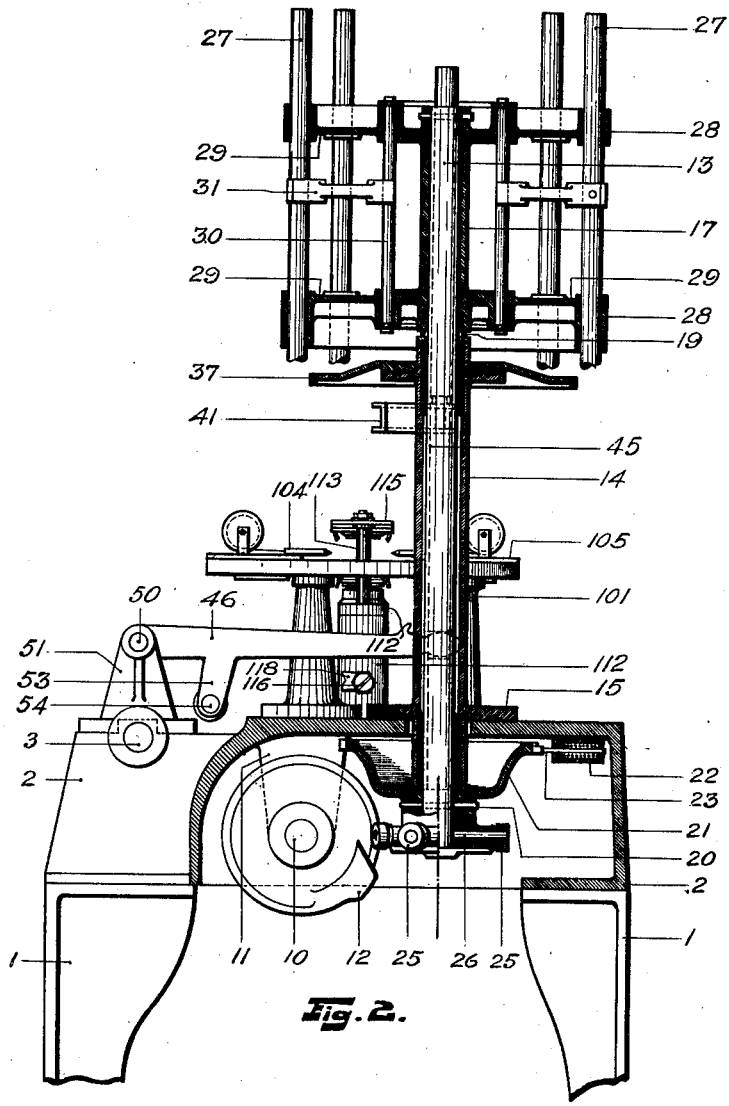
Figure 3:
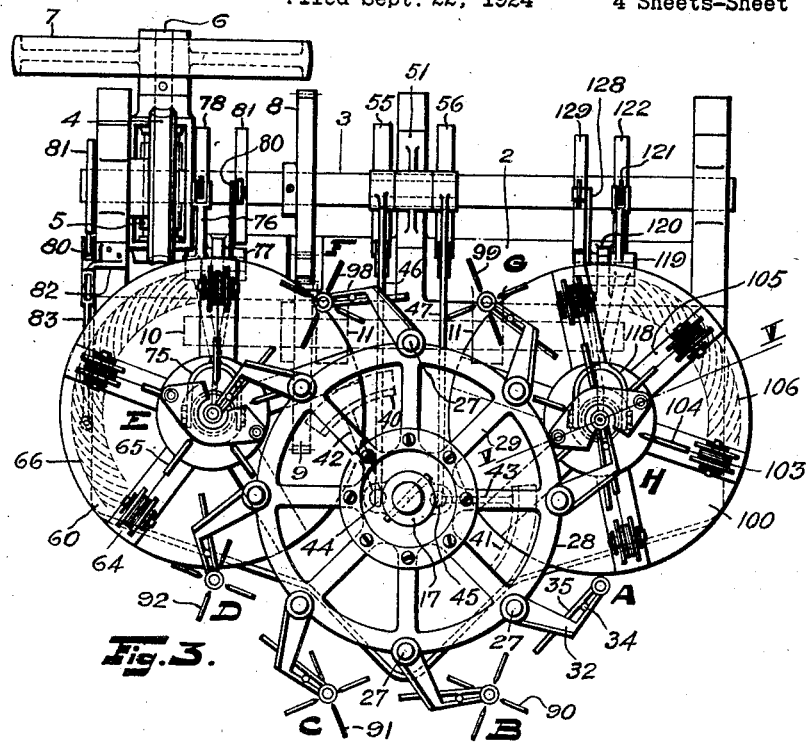
Figure 4:
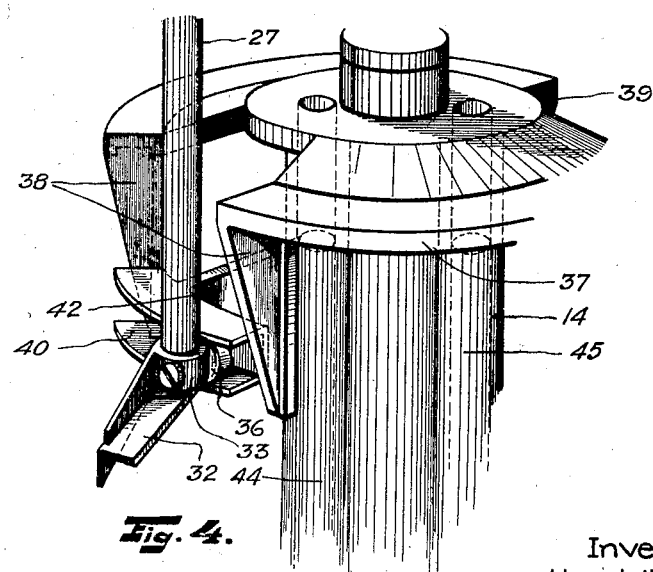

In the drawing Figure 1 is a side view of the machine, in which some members are shown in section for the sake of clearness; Fig. 2 is a view at right angles to that of Fig. 1, in which some members are omitted for clearness, and other members are shown in section. The section is made along the axis of the spider for moving the carriers for the glass rods; Fig. 3 is a plan view of the machine, in which some members are omitted; Fig. 4 is a perspective view of a part of the horizontal guide for the carriers with one of the vertically movable guides; Fig. 5 is a vertical section over the line V—V in Fig. 3 of the ring-shaped dies for cutting off and forming hooks with the members belonging thereto; Fig. 6 is a vertical section over the line VI—VI in Fig. 1, in which different members are shown in view; Fig. 7 is a vertical section over the line VII—VII in Fig. 1 and shows the driving mechanism of the vertical rod for forming the top; Fig. 8 is a plan view of the lowermost die for forming and cutting off the hooks in the top of the glass rod; and Fig. 9 is a plan view of the uppermost die of the same set.

The machine shown in the drawing is mounted on a table 2 with legs 1, to which table different members are fixed, and beneath which some members of the driving mechanism are provided.

A horizontal shaft 3 is rotatably mounted on the table 2 and is provided with a worm-wheel 4 driven by a worm 5. The latter is arranged on a shaft 6 (Figs. 1 and 3), on which also a pulley 7 is arranged. This pulley is continuously driven by some suitable means.

Fixed to the shaft 3 is a gear 8 (Fig. 3) which meshes with a gear 9 on a horizontal shaft 10. The latter is mounted in brackets 11, secured to the table 2.

The shaft 10 is provided with a cam 12 (Fig. 2), which cooperates with a disc 20 provided with rollers 25, being arranged on spindles 26 rotatable in the disc 20. The disc 20 is fixed to a vertical shaft 13 which drives the means for moving and positioning the glass rods.

When the main shaft 3 rotates, the shaft 13 is rotated intermittently. The latter is rotatable in a vertical standard 14 which is mounted on the table 2 by means of a base 15.

Rotatable with the shaft 13 is a spider 17, on which the carriers for the glass rods are mounted. The spider is carried on the upper edge of the standard 14 by an anti-friction bearing 19. In order to lock the spider 17 in accurately fixed positions a cup-shaped disc 21 is connected to the disc 20 the upper edge of which is provided with slots, in which a resilient latch 23 fits.

The spider 17 is provided with arms 29 which end in sleeves 28, in which rods 27 are vertically reciprocable. A number of vertical rods 30 are fixed to the spider, along which the free ends of arms 31 are slidable, which arms are connected to the rods 27. By this arrangement rotation of the reciprocating rods 27 is prevented, which is important, as the glass rods must every time accurately arrive in the same position in the devices for inserting the hooks.

A carrier 32 for the glass rods is connected to the lower part of each rod 27 by means of a clamp 33 (Fig. 1). These carriers may be provided in the known manner with resilient clamping means for the glass rods. Arranged on the carriers 32 are rollers 36, which roll along the upper flange of a horizontal table 37, when the spider rotates. The table 37 is connected to the standard 14. By this means the rods 27 are kept at a predetermined height during their travel.

The flange of the table 37 is interrupted at two places, in which vertically reciprocable guides 40 and 41 are provided, the lower flanges of which correspond with the flange of the table 37, when they are in their uppermost position (Fig. 4). Accordingly during the rotation of the spider, the rollers 36 arrive on the guides 40 and 41 at predetermined moments, so that the rods 27 can follow the reciprocating movement of these guides.

The guides 40 and 41 are guided by flanges 38 and 39 secured to the table 37, and are connected by means of arms 42 and 43 to vertically reciprocable rods 44 and 45 slidable in cylindrical bearings of the standard 14 by means of levers 46 and 47 the free ends of which engage slots of the said rods. The said levers are pivotally mounted on a common spindle 50, that rests in a bracket 51 (Fig. 2).

Fixed to the shaft 3 are two cams 55 and 56 (Fig. 3), that periodically act on arms of the levers 46 and 47. The lever 46 for instance is provided with an arm 53 (Fig. 2) on the end of which a roller 54 is arranged, which engages the cam 55.

The driving mechanism of the guides 40 and 41 is such, that the glass rods are lowered at predetermined moments for the inserting of the hooks when the spider 17 is stationary, whereupon the spider is rotated and the rods are thus laterally moved from the inserting devices, and in the meantime the movable guides are raised.

As it is shown in Fig. 3, eight carriers are provided for holding the glass rods, and accordingly the machine has eight positions in which the different operations are performed.

In position A a finished stem is removed from the carrier by the operator and a glass rod is put in its place. As a rule the glass rod will be fused into the tubular part of a stem in which the leading-in wires for the lamp are sealed.

The spider 17 is then rotated by its driving mechanism and the glass rod is moved towards position B, in which four burners 90 are provided for heating the part of the glass rod that is to be shaped in the form of a button.

In position C the said part of the glass is heated further by burners 91.

In position D a still further heating of the glass rod is caused by burners 92, and moreover a vertical reciprocable rod 93 (Fig. 1) is provided in this position for forming the button.

The spider 17 is then moved towards position E, in which the carrier is lowered when the corresponding roller 36 arrives at the guide 40, so that the glass rod is centrally positioned in relation to the wire-feeding devices 65 for inserting hooks in the button and to the dies 70 and 71 (Fig. 1) for cutting off and forming hooks. When the spider is moved further, guide 40 is raised in the meantime, so that the glass rod with the hooks inserted in the button is moved both laterally and vertically from the dies and towards position F. The dies are provided with vertical slots for the passage of the glass rod. In position F the end of the glass rod is heated by burners 98, and the heating is continued in position G by burners 99.

In position H the glass rod is lowered so that it is centrally positioned in relation to the wire-leading devices 104 and the dies 115 and 126 (Fig. 1). The hooks being inserted in the top and formed and cut off, the finished stem is moved laterally through a slot 145 (Fig. 9) in the uppermost die 115 and carried into position A, in which it is removed from the machine by the operator. The inserting positions E and H are not arranged in one plane though the axis of the spide 17 as will be clear from Fig. 3, and neither the guides 40 and 41 are arranged diametrically in relation to each other. However, in Fig. 1 the machine is shown as if this were the case.

The machine as a whole being now described, some members, that are in particular relative to the invention, will be described in detail.

In position D of the machine, the button of a glass rod is formed by the vertically reciprocable push rod 93 that is connected to the end of a lever 94, pivotally mounted on a spindle 95 (Figs. 1 and 7.) The lever 94 is twice bent in a right angle, and bears at its other end a roller 96 on which the circumference of a cam 97 acts. The said cam is fixed on the horizontal shaft 10, and consequently the rotating of this shaft causes a periodical reciprocating movement of the rod 93 over a predetermined distance, which rod pushes the glass rod a little upwards, whereby a button is formed at the part that is fused by the flames.

In position E of the machine is the anchor wire feed mechanism, comprising a fixed horizontal table 60, which rests on columns 61 and 62, and carrying feed rolls 63 and wire guides 65 for advancing the wires. The rolls and wire guides are positioned on slides 64 radially movable on the table by pins connected to the slides, which pins fit in eccentric grooves of a ring 66 (Fig. 3.) The said ring is rotatably mounted in the table 60 and is held in position by little plates projecting from the columns 61 and 62. The ring 66 is rotated by a rod 83 connected thereto, which rod is reciprocated by a lever 80, pivotally mounted on a bracket 82. A cam 81 on the shaft 3 acts on the free end of the lever 80.

After the wires have been inserted in the softened glass the wire guides 65 on the slides 64 are given a backward movement, the glass being then sufficiently cooled to retain the wires, so that the rolls 63 are unrolled a little. The construction of the rolls, wire guides and ring 66 forms no part of the invention so that a detailed description can be omitted.

It is of course also possible to use other forms of wire feed mechanism, and to provide in other known ways fixed wire rolls and radially movable wire guides. In this case the wire guides must be constructed so as to withdraw the wire on their forward movement and to slide along the wires when moving back.

On a sleeve 68 columns 69 are provided bearing the ring-shaped die 70. The other die 71 is mounted on a rod slidable in a standard 72. The construction of the dies with their driving mechanism will be clear from Figs. 5, 8 and 9, in which the dies in the position for inserting hooks in the top are shown, which dies are similar to those in the inserting position of the hooks in the button. On a horizontal table 100 (Fig. 1) resting on columns 101 and 102 slides 105 are provided for wire-rolls 103 and wire guides 104, which slides are radially reciprocable by means of a ring 106 provided with eccentrical grooves.

On a vertical hollow standard 110 (Fig. 5), resting on the table 2 by means of a flange 111 a sleeve 112 is slidable on which the posts 113 and 114 carrying the uppermost die 115 are mounted. The sleeve 112 is provided with pins 116 and 117 that are engaged by the ends 118 of a bifurcated lever pivoted on a spindle 119 that is mounted in a bracket 120. The free end of the lever 118 is provided with a roller 121 actuated by a cam 122 (Fig. 3) fixed on the shaft 3. When the latter shaft is rotated the sleeve 112 and the die 115 are vertically reciprocated.

Slidable in the standard 110 is a bushing 125 on the upper end of which a ring-shaped die 126 is mounted. The bushing 125 is reciprocated by a lever 128 one end of which engages a slot of it. The lever 128 is pivoted on a pin 119 (Figs. 3 and 6) and is reciprocated by a cam 129 on the shaft 3 which actuates a roller at the free end of the lever.

Slidable in the bushing 125 is a rod 130 for forming the top of a glass rod. The rod rests on a lever 131 (Fig. 6) pivotally mounted on a pin 132 and provided at its free end with a roller that is actuated by a cam 133 on the shaft 10. Rotating of the latter causes the rod 130 to be periodically reciprocated. The upper end of the rod is provided with a cup 140 (Fig. 5) for forming the top of a glass rod.

The driving mechanism of the different members is such that, when the glass rod with its heated end is brought into operating position, the rod 130 is first moved upwards, whereby the top is formed. The rod is then lowered a short distance, and the ends of the wires are pressed in the heated top by the wire guides 104. Thereupon the wire guides are given a backward movement, and the wires are retained in the glass, that has become cool in the meantime. The dies 115 and 126 are then moved towards each other, whereby the wires are first cut off between cutters 141 and 142 (Fig. 8) and then bent near their free ends into the form of a hook, by means of an edge 143 of the lowermost die, which enters a ring-shaped groove 144 of the uppermost die.

The dies are then moved away from each other and the finished stem is laterally moved from the inserting position. A vertical movement of the wire support is not possible because in this case the hooks would touch the die 115. To enable the lateral movement of the stem, the die 115 is provided with a vertical slot 145 (Fig. 9) for the passage of the glass rod.

What we claim as new and desire to secure by Letters Patent of the United States, is:—

1. In a hook-inserting machine, the combination of a pair of coaxial annular wire cutting and bending dies relatively movable along their axis to make hooks from wires extending between said dies, and means for positioning a glass rod having imbedded in it a plurality of spaced radially extending wires to bring said wires between said dies.

2. In a hook-inserting machine, the combination of cooperating annular wire cutting and bending dies mounted to move toward each other along their axis and thereby make hooks from wires placed between said dies, at least one of said annular dies having in one side a slot parallel to its vertical axis, and means for moving a glass rod having imbedded in it a plurality of spaced radial wires laterally through said slot to bring said wires between said annular dies.

3. In a hook-inserting machine, the combination of annular wire cutting and bending dies to make a hook from a wire between them, one of said dies having a slot in the side, and means for moving a glass rod having imbedded in it a plurality of spaced radial wires into and out of operative relation to said dies by lateral movement through said slot.

4. In a hook-inserting machine, the combination of cooperating annular cutting and bending dies movable toward each other to make hooks from wires placed between said dies, wire feed mechanism for placing wires between said dies with the ends of said wires at the axis of said annular dies, a rod carrier mounted to bring a predetermined portion of a glass rod to the axis of said dies and in juxtaposition to the ends of said wires, and heating means adjacent the path of said rod to render plastic said portion of said glass rod to permit the ends of said wire to be embedded in the glass rod.

5. In a hook-inserting machine, the combination of cooperating annular wire cutting and bending dies for making hooks, wire feed mechanism for placing wires between said dies with their ends at the center of said dies, a rod carrier mounted to bring a glass rod to the axis of said dies, means for heating a portion of said rod, and a push rod vertically movable along the axis of said dies to engage the glass rod and upset the heated portion thereof into an enlargement or button.

6. In a hook-making machine, the combination of a fixed tubular standard, a sleeve vertically movable on said standard, an annular die mounted on said sleeve, a member slidably mounted on said tubular standard, and a cooperating annular die mounted on said member to cooperate with the die on said sleeve to cut and bend wires between said dies into hooks.

7. In a hook-inserting machine, the combination of a movable rod carrier for a glass rod, and two hook making and inserting devices mounted adjacent the path of a rod in said carrier but at different distances from the path of said carrier, whereby one of said devices cooperates with the ends of said rod and the other with an intermediate portion thereof, each of said devices comprising a pair of cooperating annular wire cutting and hook forming dies relatively movable longitudinally of the rod in said carrier and having in one side a slot to permit lateral movement of the rod to the axis of said dies, means for heating the end and said intermediate portion of said rod while in said carrier, wire feed mechanism for feeding wires radially toward the axis of said dies to embed their ends in the portion of the rod at the axis of said dies, and common driving means for actuating said carrier and said dies in predetermined sequence.

8. In a hook-inserting machine, the combination of a horizontally movable carrier for carrying a glass rod with its end downward, two hook forming and inserting devices mounted at different heights in the path of said rod in said carrier to insert hooks in the end and in an intermediate portion of said rod, each of said devices comprising cooperating annular wire cutting and bending dies relatively movable along a vertical axis in the path of movement of said rod, and wire feed mechanism for feeding wires radially and horizontally between said dies to bring their ends into engagement with the portion of the rod at the axis of the dies, and common driving mechanism for actuating said carrier and said hook inserting device.

9. In a hook-inserting machine, the combination of cooperating annular wire cutting and bending dies relatively movable along a vertical axis, means for feeding wires horizontally between said dies to bring their ends to the axis of said dies, at least one of said dies having a vertical slot in the side, a vertically and horizontally movable rod carrier for holding a glass rod vertically with its end downward, and common driving means for actuating said dies and wire feeding mechanism and for first moving said rod carrier vertically to bring a predetermined portion of the glass rod in said carrier to the axis of said dies in position to receive the ends of said wires and for then moving the rod carrier laterally to carry the rod out of the dies through said slot.

10. In a hook-inserting machine, the combination of a horizontally movable spider having vertically movable rod carriers for glass rods, means for heating different portions of the glass rods in said carriers, hook forming and inserting devices adjacent different points of the path of said carrier and each comprising a pair of cooperating vertically movable annular dies for cutting and bending wires, and wire feeding mechanism for feeding wires horizontally to said dies, a vertically movable rod coaxial with each set of dies to compress longitudinally the glass rod in each carrier at the axis of said dies and thereby enlarge the heated portion of the rod, and common actuating means for automatically moving the different parts of the machine in synchronism with one another.

11. In a hook-inserting machine, the combination of a horizontally movable spider, a vertically movable rod carrier mounted on said spider and having an actuating roller, a fixed horizontal roller guide and two corresponding vertically movable roller guides for engaging said roller and thereby moving said carrier vertically during movement of said spider to bring a rod in said carrier into operative relation to a hook forming and inserting device mounted adjacent the path of the rod in said carriers and comprising cooperating annular wire cutting and bending dies, at least one of said dies having in the side a slot to permit the rod in said carrier to be moved laterally away from the dies.

12. In a hook-inserting machine the combination of a hook forming and inserting device comprising cooperating annular dies, and wire feeding mechanism for feeding wires to said dies, a horizontally movable spider having vertically movable rods slidably mounted on it, carriers mounted on and movable with said rods, guide arms rigidly connected to said rods, and vertical guides fixed on the spider to cooperate with and guide said arms throughout the movement of the vertical rods and thereby keep the carriers in a predetermined angular position with relation to the spider during their vertical reciprocation.

In testimony whereof, we have hereunto set our hands this first day of September, 1924.

HENDRIK DE JONG.
WILLEM KONING.